United States Patent
Ye et al.

(10) Patent No.: US 12,289,456 B2
(45) Date of Patent: Apr. 29, 2025

(54) METHOD AND APPARATUS FOR INTRA CHROMA CODING IN IMAGE AND VIDEO CODING

(71) Applicant: MEDIATEK INC., Hsin-Chu (TW)

(72) Inventors: Jing Ye, San Jose, CA (US);
Xiaozhong Xu, State College, PA (US);
Shan Liu, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 435 days.

(21) Appl. No.: 16/338,514

(22) PCT Filed: Sep. 28, 2017

(86) PCT No.: PCT/CN2017/103851
§ 371 (c)(1),
(2) Date: Apr. 1, 2019

(87) PCT Pub. No.: WO2018/064948
PCT Pub. Date: Apr. 12, 2018

(65) Prior Publication Data
US 2020/0045322 A1 Feb. 6, 2020

Related U.S. Application Data (60) Provisional application No. 62/420,659, filed on Nov. 11, 2016, provisional application No. 62/403,735, filed on Oct. 4, 2016.

(51) Int. Cl.
*H04N 19/176* (2014.01)
*H04N 19/105* (2014.01)
(Continued)

(52) U.S. Cl.
CPC ......... *H04N 19/176* (2014.11); *H04N 19/105* (2014.11); *H04N 19/11* (2014.11);
(Continued)

(58) Field of Classification Search
CPC ............... H04N 19/159; H04N 19/186
See application file for complete search history.

(56) References Cited

U.S. PATENT DOCUMENTS

| 10,123,008 B2 | 11/2018 | Chuang et al. |
| 2012/0287995 A1 | 11/2012 | Budagavi |

(Continued)

FOREIGN PATENT DOCUMENTS

| CN | 1784015 A | 6/2006 |
| CN | 103636203 A | 3/2014 |

(Continued)

OTHER PUBLICATIONS

International Search Report dated Jan. 4, 2018, issued in application No. PCT/CN2017/103851.

(Continued)

*Primary Examiner* — Jayanti K Patel
*Assistant Examiner* — Christopher Kingsbury Glover
(74) *Attorney, Agent, or Firm* — McClure, Qualey & Rodack, LLP (57) ABSTRACT

A method and apparatus for video coding of chroma coded in derived-mode Intra prediction are disclosed. If derived-mode (DM) Intra prediction is selected for a current chroma block, a corresponding luma block area is determined by locating a first upper-left pixel address of the corresponding luma block area corresponding to that of the current chroma block. Further, one or more candidate luma coding modes are determined from a sub-block set consisting of one or more sub-blocks of the corresponding luma block area, where if the sub-block set consists of only one sub-block, the sub-block set excludes a corner sub-block located at a top-left corner of the corresponding luma block area. Additionally, a current chroma Intra mode for the current chroma block is derived based on information comprising the can- (Continued)

didate luma coding modes, and Intra-prediction encoding or decoding is applied to the current chroma block using the current chroma Intra mode derived.

18 Claims, 9 Drawing Sheets

(51) Int. Cl.
  *H04N 19/11* (2014.01)
  *H04N 19/159* (2014.01)
  *H04N 19/186* (2014.01)
  *H04N 19/593* (2014.01)
(52) U.S. Cl.
  CPC ......... *H04N 19/159* (2014.11); *H04N 19/186* (2014.11); *H04N 19/593* (2014.11)

(56) References Cited

U.S. PATENT DOCUMENTS

| | | | | |
|---|---|---|---|---|
| 2013/0136174 A1* | 5/2013 | Xu | .......... | H04N 19/11 |
| | | | | 375/240.12 |
| 2014/0098862 A1* | 4/2014 | Yang | .......... | H04N 19/159 |
| | | | | 375/240.12 |
| 2014/0140401 A1* | 5/2014 | Lee | .......... | H04N 19/186 |
| | | | | 375/240.12 |
| 2014/0355667 A1* | 12/2014 | Lei | .......... | H04N 19/593 |
| | | | | 375/240.02 |
| 2019/0230352 A1* | 7/2019 | Heo | .......... | H04N 19/11 |

FOREIGN PATENT DOCUMENTS

| | | | |
|---|---|---|---|
| CN | 103650512 A | 3/2014 | |
| CN | 103782596 A | 5/2014 | |
| CN | 103918269 A | 7/2014 | |
| IN | 103782596 A | 5/2014 | |
| WO | 2013/006986 A1 | 1/2013 | |
| WO | WO-2018035130 A1 * | 2/2018 | ........... H04N 19/593 |

OTHER PUBLICATIONS

Zhang, L., et al.; "Multiple Direct Modes for Chroma Intra Coding;" Joint Video Exploration Team (JVET) of ITU-T SG 16 WP 3 and ISO/IEC JTC 1/SC 29/WG 11; Oct. 2016; pp. 1-4.

* cited by examiner

METHOD AND APPARATUS FOR INTRA CHROMA CODING IN IMAGE AND VIDEO CODING

CROSS REFERENCE TO RELATED APPLICATIONS

The present invention claims priority to U.S. Provisional Patent Application, Ser. No. 62/403,735, filed on Oct. 4, 2016 and U.S. Provisional Patent Application, Ser. No. 62/420,659, filed on Nov. 11, 2016. The U.S. Provisional patent applications are hereby incorporated by reference in their entireties.

FIELD OF THE INVENTION

The present invention relates to Intra coding in image and video coding. In particular, the present invention discloses Intra prediction mode derivation for the Intra derived-mode (DM) coded chroma component of color images or color video to improve the coding efficiency.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

Figure 1:
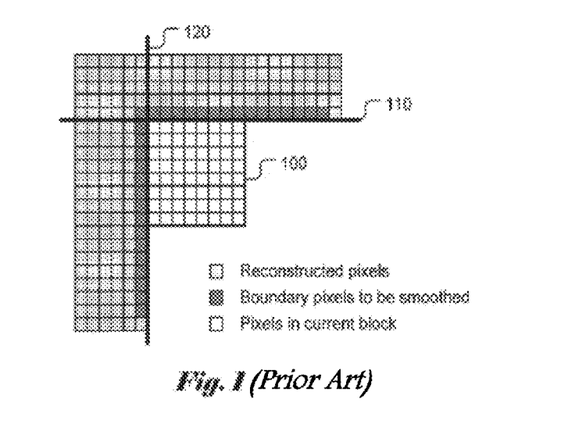
FIG. 1 illustrates the samples involved in Intra smoothing applied to a transform unit (TU) according to High Efficiency Video Coding (HEVC).

The HEVC coding comprises Inter prediction and Intra prediction. For Intra prediction, the generation of Intra prediction includes three parts: Intra smoothing filter, Intra prediction, and Intra gradient filter. At first, a smoothing operation is applied to the reference samples as a pre-processing step before calculating the prediction. This smoothing operation corresponds to applying an FIR-filter with filter weights [1,2,1]>>2, with low-pass characteristics to the samples belonging to the left column and the above row of the current TU (transform unit). The Intra prediction of each TU is produced with the reconstructed samples of neighboring TUs. The samples involved in Intra smoothing are indicated in FIG. 1, where block 100 corresponds to the current block, line 110 corresponds to a horizontal boundary and line 120 corresponds to a vertical boundary. Whether this smoothing operation is used is determined by the TU size and the Intra prediction mode. Second, the Intra prediction of current block is derived from neighboring reference samples with a certain Intra prediction mode, and the Intra prediction mode is selected from DC mode, planar mode, and 33 directional modes by encoder and signaled in the bitstream. Third, if the Intra prediction mode is DC, horizontal or vertical mode, Intra gradient filter is further applied to the samples at the left and top boundaries of the current TU.

Figure 2:
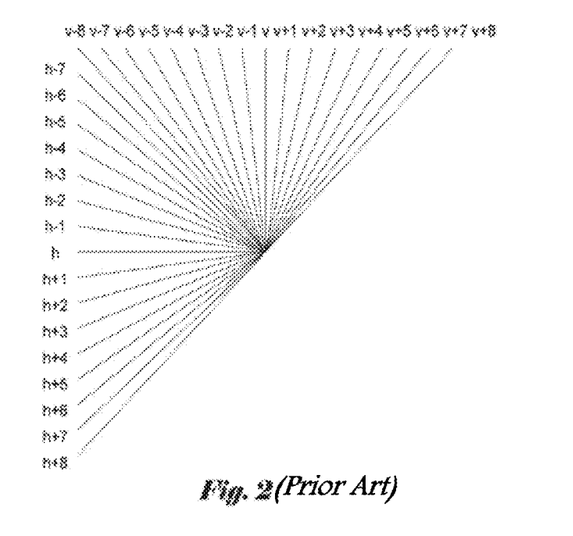
FIG. 2 illustrates the 33 directions for Intra prediction according to High Efficiency Video Coding (HEVC), where the directions are designated as H, H+1, H+8, H−1, . . . , H−7, V, V+1, V+8, V−1, . . . , V−8.

Out of all 35 Intra prediction modes in HEVC, three modes are considered as most probable modes (MPM) for predicting the Intra prediction mode in current prediction block. For example, the Intra prediction modes used in the left prediction block and in the above prediction block can be used as candidates of the MPM set. In the case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 2. In FIG. 2, there are all together 33 directional modes, i.e., H, H+1, . . . , H+8, H−1, . . . , H−7, V, V+1, . . . , V+8, V−1, . . . , V−8. This system can be expanded to a general case, where horizontal and vertical modes are represented as H and V modes. For other directional modes, they can be represented either as H+k or V+k modes, where k=±1, ±2, etc. For example, if 65 directional modes are used as shown in FIG. 3, k can be range from ±1 to ±16.

Figure 3:
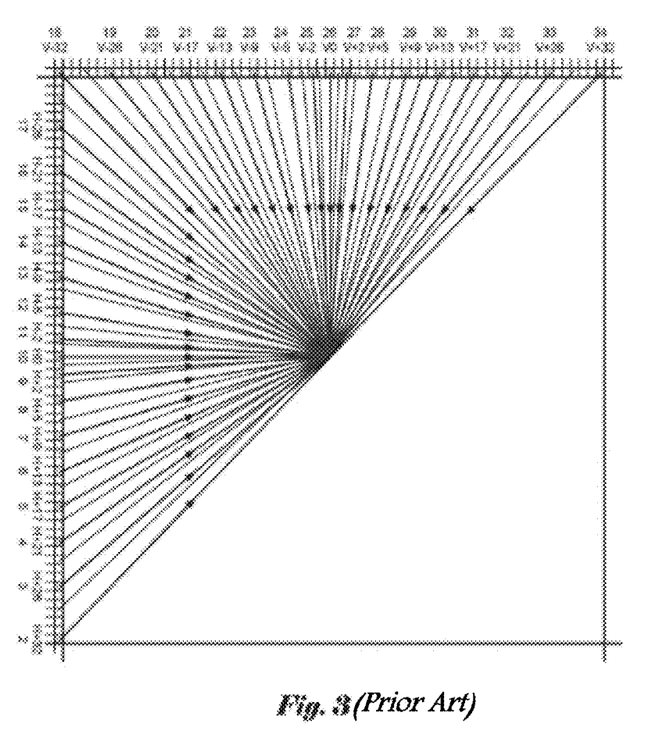
FIG. 3 illustrates an example of 65 directions for Intra prediction by adding 32 directional modes in between the existing 33 directional modes.

In some recent development beyond HEVC, additional 32 directional modes are used in between the existing 33 directional modes, as shown in FIG. 3. In this case, there are a total 65 modes including directional modes as well as some non-directional modes.

In HEVC, once a directional mode is decided, along the prediction direction, all the pixels in the current block will use the same predictor value. If the predictor falls in between two reconstructed reference sample, a bi-linear filter will be used to calculate the predictor as a weighted average of the two neighboring pixels. For example, the predictor signal P can be derived according to P=[P1*a+P2*(32−a)]/32, where P1 and P2 are the two neighboring reconstructed samples, integer a is the distance from the predictor P to P2 with a range between 0 and 32, inclusively.

Figure 4A:
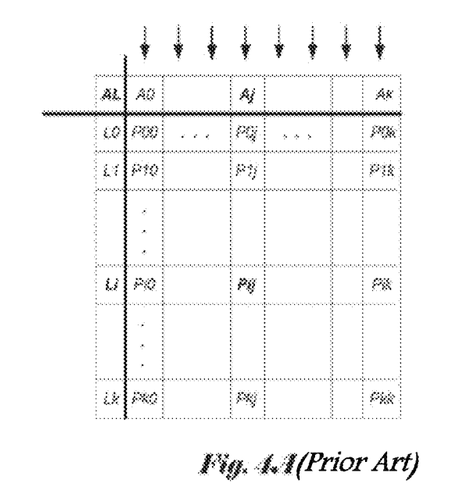
FIG. 4A illustrates an example for the vertical directional mode for Intra prediction.

The concept of Intra gradient filter is to utilize the gradient information along the Intra prediction direction to improve the quality of Intra prediction. For the Intra prediction modes from vertical/horizontal directions (v/h) to vertical/horizontal+8 directions (v+8/h+8) as shown in FIG. 2, the left column/the above row neighboring samples can locate their corresponding references along the Intra prediction direction from the above row/the left column. The gradient calculated with the neighboring samples can be used to improve the Intra prediction. An example for the vertical directional mode is illustrated in FIG. 4A, where $P_{ij}$ denotes the predictor at row i and column j. AL represents the reconstructed sample at the left-above corner of the current block, while $L_i$ represents the reconstructed sample in the left column of the current block. A new predictor is calculated as $$P'ij = Pij + \alpha \cdot (Li - AL), \qquad (1)$$

where $\alpha$ is a fraction from 0 to 1 and is selected according to j, such as $\alpha = \frac{1}{2}$ for j=0, and $\alpha = \frac{1}{4}$ for j=1. $P'_{ij}$ is used as the final predictor. As for the horizontal directional mode, the final predictor $P'_{ij}$ is calculated as $$P'ij = Pij + \alpha \cdot (Aj - AL), \qquad (2)$$

Figure 4B:
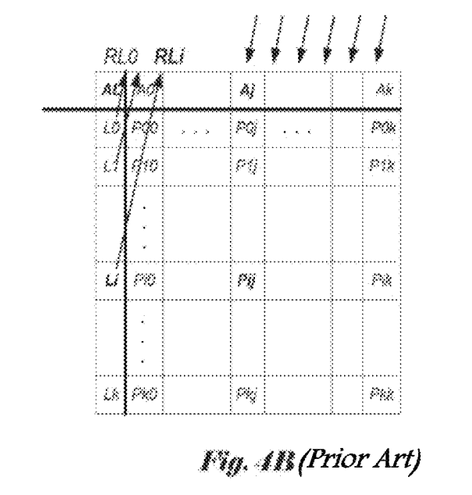
FIG. 4B illustrates an example Intra gradient filter for the Intra prediction modes from (v+1) to (v+8) according to High Efficiency Video Coding (HEVC).

In the above equation, Aj is the reconstructed sample in the above row, which is shown in FIG. 4A. As for the directional modes v+1, . . . , v+8 and h+1, . . . , h+8, Li or Aj first obtains its corresponding reference sample RLi or RAj along the direction of Intra prediction. When RLi or RAj is not located at the position of integer pixel, they are produced by interpolation of integer pixels in the above row or the left column of the current block. The example of v+1, . . . , v+8 directional modes is shown in FIG. 4B. The final predictor P'ij is calculated as $$P'ij = Pij + \alpha \cdot (Li - RLi). \qquad (3)$$

Similar to the vertical directional mode, $\alpha$ is a fraction from 0 to 1 and is selected according to the direction of Intra prediction and j. As for h+1, . . . , h+8 directional modes, the final predictor $P'_{ij}$ is calculated as $$P'ij = Pij + \alpha \cdot (Aj - RAj), \qquad (4)$$

where $\alpha$ is a fraction from 0 to 1 and is selected according to the direction of Intra prediction and i.

The Intra gradient filter can be applied for all directional modes, i.e., v+1, . . . , v+8 and h+1, . . . , h+8 in HEVC. However, only when the Intra prediction mode is DC, horizontal or vertical mode, Intra gradient filter is used. If the Intra prediction is DC mode, the samples at the first row and first column are filtered by Intra gradient filter. If the Intra prediction is horizontal mode, then the samples at the first row are filtered by Intra gradient filter. If the Intra prediction is vertical mode, then the samples at the first column are further filtered by Intra gradient filter.

Figure 5:
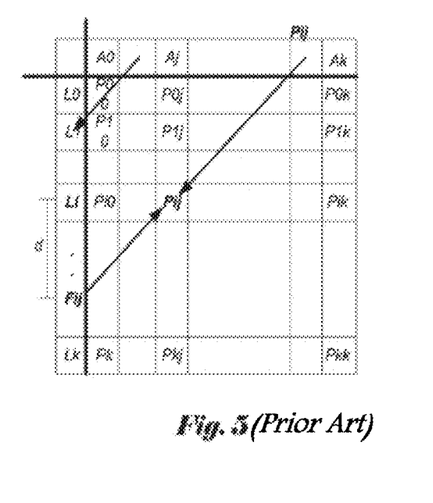
FIG. 5 illustrates an example bi-directional prediction filter for the Intra prediction modes from (v+1) to (v+8) according to High Efficiency Video Coding (HEVC).

Besides Intra gradient filtering, another method called bi-directional Intra prediction is also proposed to improve the quality of Intra prediction in JCT-VC meetings. For diagonal Intra prediction modes, i.e. v+1, . . . , v+8 and h+1, . . . , h+8, a weighted sum of the reconstructed samples of the above row and the reconstructed samples from the left column along the direction is used as the Intra predictor. For example, for v+1, . . . , v+8 directional modes, as illustrated in FIG. 5, Pij from the neighboring samples of above row has a corresponding reference sample Fij in the left column along the prediction direction. If Fij is not located at the integer pixel position, it can be generated by interpolating integer pixels in the left column. The final predictor $P'_{ij}$ is then calculated as the weighted sum of Pij and Fij as $$P'ij = \alpha \cdot Pij + (1-\alpha) \cdot Fij \qquad (5)$$

where $\alpha$ is a fraction from 0 to 1 and is selected according to the direction of Intra prediction together with j (for v+1, . . . , v+8 directional modes) or i (for h+1, . . . , h+8 directional modes).

After generating Intra predictors, the prediction error is further processed by transform and quantization and encoded by entropy coding. For entropy coding, the quantized coefficients are divided into multiple 4×4 coefficient groups, first. The coding order of different coefficient groups and scan order of coefficients in one coefficient group is selected according to Intra prediction mode and transform size. If the transform size is smaller than or equal to 8×8, Intra-mode-dependent scan will be used for the coding order of different coefficient groups and scan order of coefficients in one coefficient group. Otherwise, diagonal scan is used for the coding order of different coefficient groups and scan order of coefficients in one coefficient group.

Figure 6:
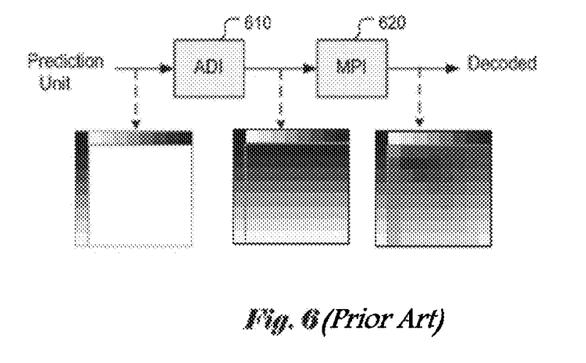
FIG. 6 illustrates an example of multiple parameter Intra prediction (MPI) process.

Also, it is possible to have weighted sum of several predictors to generate the final prediction signal for Intra prediction (namely multiple parameter Intra prediction or MPI). The final predictor PMPI[i, j] of position (i,j) is defined as follows:

$$P_{MPI}[i,j] = (\alpha P_{HEVC}[i,j] + \beta P_{MPI}[i-1,j] + \gamma P_{MPI}[i,j-1] + \delta P_{MPI}[i-1,j-1]+4) >> 3,$$

where outside of the block $P_{MPI}[i, j]$ is equal to reconstructed signal as shown in FIG. 6, $$P_{MPI}[i,j] = REC[i,j], \text{ if } i<0 \| j<0.$$

FIG. 6 illustrates an example of multiple parameter Intra prediction (MPI) process, where an input block is processed by Arbitrary Directional Intra (ADI) 610 followed by MPI 620. The strength of this post-processing (i.e., parameters $\alpha+\beta+\gamma+\delta=8$) is controlled on the CU level and signaled with up to 2 bits.

Figure 7:
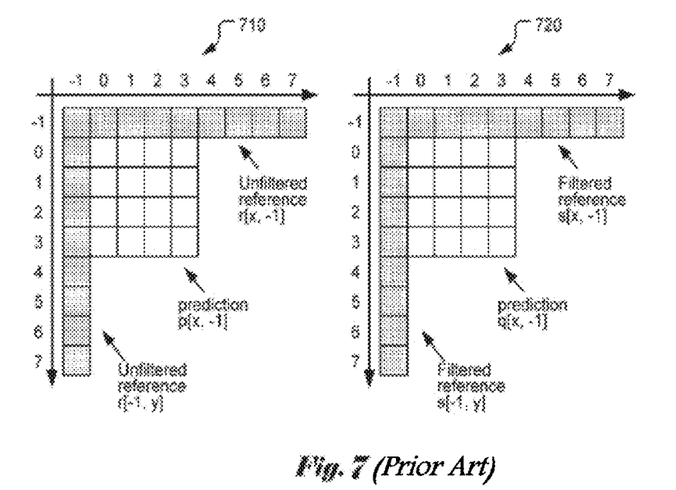
FIG. 7 illustrates an example of Intra prediction in 4×4 blocks for the unfiltered and filtered cases.

In an ITU-T contribution C1046 (A. Said, etc., "Position dependent Intra prediction combination," ITU-T SG16 COM 16-C1046-E, October 2015), a method is proposed to use a combination of filtered and unfiltered reference samples to form the final predictor p[x,y] as shown in FIG. 7 for unfiltered (710) and filtered (720) cases.

Signals r and s are used to represent the sequences with filtered and unfiltered references.

The new prediction p[x,y] combines weighted values of boundary elements r[ ] with q[x,y] (i.e., predictor derived from filtered samples s[ ]) as following:

$$p[x,y] = \{(c_1^{(v)} >> \lfloor y/d \rfloor) r[x,-1] - (c_2^{(v)} >> \lfloor y/d \rfloor) r[-1,-1] + (c_1^{(h)} >> \lfloor x/d \rfloor) r[-1,y] - (c_2^{(h)} >> \lfloor x/d \rfloor) r[-1,-1] + b[x,y] q[x,y] + 64\} >> 7$$

where $c_1^v, c_2^v, c_1^h, c_2^h$ are stored prediction parameters, d=1 for block sizes up to 16×16, and d=2 for larger blocks, and $$b[x,y] = 128 - (c_1^{(v)} >> \lfloor y/d \rfloor) + (c_2^{(v)} >> \lfloor y/d \rfloor) - (c_1^{(v)} >> \lfloor y/d \rfloor) + (c_2^{(h)} >> \lfloor y/d \rfloor),$$

is a normalization factor.

Figure 8:
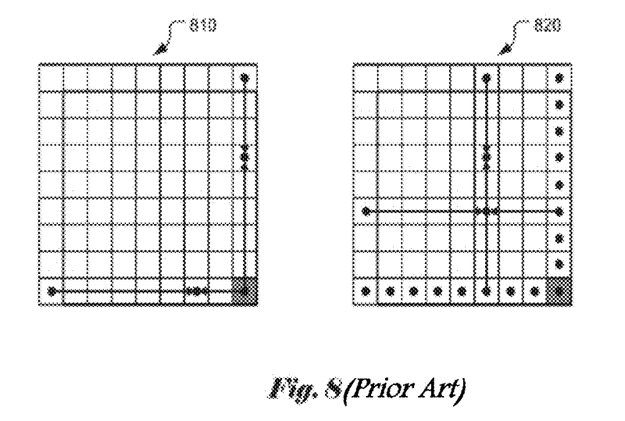
FIG. 8 illustrates an example of Bi-linear interpolation of right most column and bottom row (left) and Bi-linear interpolation of the rest samples (right).

In the contribution JVET-C-0061 (X. Xiu, etc., "Decoder-side Intra mode derivation", JVET-00061, May, 2016), interpolation for Intra prediction using the planar mode is disclosed. According to JVET-C-0061, the sample at bottom-right corner current prediction block is either signaled or estimated using linear average of corresponding left reference sample and above reference sample). Accordingly, samples in the right most column and bottom row are bi-linearly interpolated using the top/bottom-right sample combination and the left/bottom-right sample combination (810) as shown in FIG. 8. The remaining pixels in the prediction block are predicted using similar bi-linear interpolation (820), as is shown in FIG. 8.

Quadtree Plus Binary Tree (QTBT) Structure

In contribution m37524/COM16C966 (J. An, et al., "Block partitioning structure for next generation video coding," MPEG doc. m37524 and ITU-T SG16 Doc. COM16C966, October 2015), a quadtree plus binary tree (QTBT) block partitioning structure is disclosed. According to QTBT, a coding tree block (CTB) is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices, the luma and chroma CTBs in one coding tree unit (CTU) share the same QTBT structure. For I slice, the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting.

Figure 9:
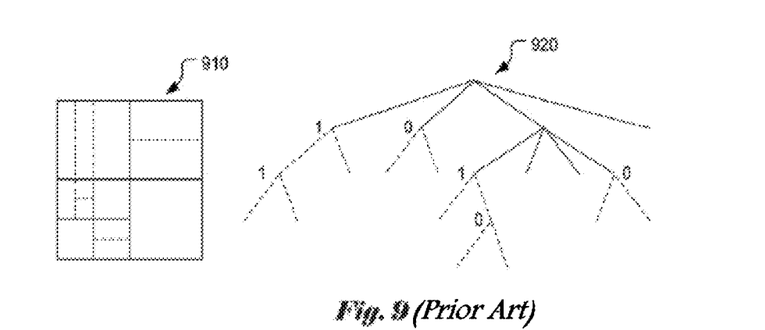
FIG. 9 illustrates an example of block partitioning by using QTBT, where the block partitioning is shown in the left and the corresponding QTBT structure is shown on the right.

Block partitioning 910 and corresponding QTBT structure 920 of FIG. 9 illustrates an example of block partitioning by using QTBT. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since it always splits a block horizontally and vertically into 4 sub-blocks of equal size.

In the above disclosure, JVET (joint video exploration team) refers to an international organization that has been established by both ITU-T VCEG and ISO/IEC MPEG to study the next generation video coding technologies. Reference software called JEM (joint exploration model) is built based on HEVC's reference software (HM). Some new video coding methods, including QTBT and 65 Intra prediction directions, are included in JEM software.

In the QTBT structure, for the I slice, when a chroma CU is coded using DM mode (derived mode from luma), the CU will use the top left chroma pixel to find the corresponding luma pixel. Accordingly, the Intra mode of the luma block containing that luma pixel is used as the chroma Intra mode.

Figure 10:
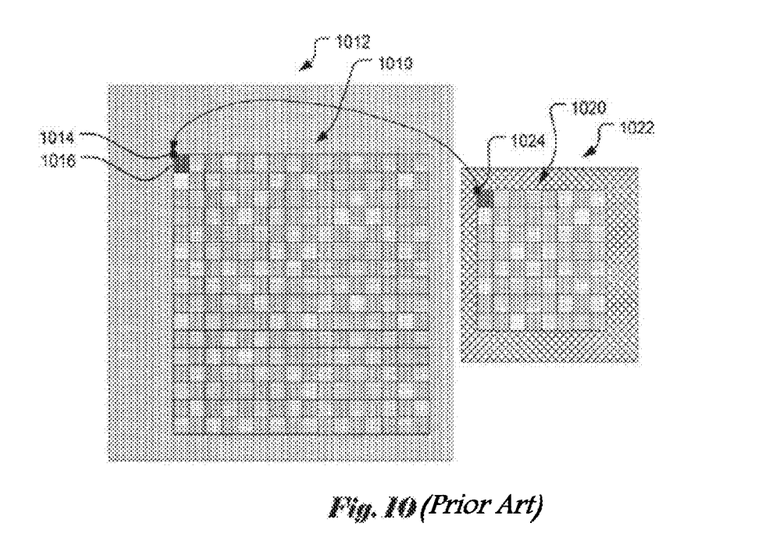
FIG. 10 illustrates an example of the derived mode (DM) for a chroma block based on the Intra mode of the upper-left corner minimum CU of a corresponding luma block area.

FIG. 10 illustrates an example of the derived mode (DM) for a chroma block. In FIG. 10, block 1020 is a chroma block partitioned from a chroma CTB 1022. Block 1010 is a corresponding luma block area within a luma CTB 1012. Black pixel 1014 indicates the upper-left corner pixel of the corresponding luma block area. Since the luma and chroma components may use separate block partitions, there may be no co-located luma block e.g. a luma coding block) for a give chroma block (e.g. a chroma coding block). Therefore, the upper-left pixel 1024 of the chroma CU will be used to find the corresponding luma CU area based on the upper-left pixel 1014 of the corresponding luma CU. The corresponding luma CU area 1010 covers equivalent luma pixel area in the luma image as the chroma block 1020. The corresponding luma CU area 1010 may correspond to one or more luma CUs or partial luma CUs. The luma Intra mode associated with a minimum CU at the upper-left corner position (1016) is used as the chroma Intra mode. In FIG. 10, each small square corresponds to a minimum CU, which is the basic unit for encoding and decoding. A CU can be formed by 1 to M minimum CU, where M=(maximum CU width/minimum CU width)×(maximum CU height/minimum CU height).

According to the conventional approach, when the derived-mode (DM) is used for a chroma block, the luma Intra mode used by the upper-left minimum CU of the corresponding luma CU area is used as the Intra mode of the associated chroma CU. However, the upper-left minimum CU may not be Intra mode coded and the chroma DM Intra prediction cannot be used. Therefore, the DM coded chroma block may not have a valid luma Intra mode to use. One of the goals of the present invention is intended to solve this issue.

BRIEF SUMMARY OF THE INVENTION

A method and apparatus for video coding chroma derived-mode Intra prediction are disclosed. According to one method, if derived-mode (DM) Intra prediction is selected for a current chroma block, a corresponding luma block area is determined by locating a first upper-left pixel address of the corresponding luma block area corresponding to a second upper-left pixel address of the current chroma block, wherein the corresponding luma block area corresponds to a same area as the current chroma block in the current color image; one or more candidate luma coding modes are determined from a sub-block set consisting of one or more sub-blocks of the corresponding luma block area, and wherein if the sub-block set consists of only one sub-block, the sub-block set excludes a corner sub-block located at a top left (TL) corner of the corresponding luma block area; a current chroma Intra mode for the current chroma block is derived based on information comprising said one or more candidate luma coding modes; and Intra-prediction encoding or decoding is applied to the current chroma block using the current chroma Intra mode derived.

The current chroma block may correspond to one chroma coding unit (CU) and the corresponding luma block area corresponds to one luma coding unit (CU). Each sub-block of the corresponding luma block area may correspond to one smallest luma coding unit (CU).

The step of determining one or more candidate luma coding modes comprises checking one or more luma coding modes associated with n sub-blocks of the sub-block set one by one until a checked luma coding mode is Intra angular mode, DC mode or planar mode and using the checked luma coding mode as the current chroma Intra mode, where n is a positive integer. The n sub-blocks of the sub-block set can be checked one by one according to a selected order. In one embodiment, if none of the luma coding modes associated with the n sub-blocks of the sub-block set is the Intra angular mode, DC mode or planar mode, the step of determining one or more candidate luma coding modes comprises selecting a default Intra mode as the current chroma Intra mode. The default Intra mode can be signaled at Sequence Parameter Set (SPS), or Picture Parameter Set (PPS), or slice header.

The default Intra mode may correspond to planar mode, DC mode, vertical mode or horizontal mode. The default Intra mode may also be derived from one or more candidate chroma Intra modes associated with one or more candidate neighboring chroma blocks of the current chroma block. For example, the candidate neighboring chroma blocks of the current chroma block consists of neighboring chroma blocks located at above left (AL), above (A), above right (AR), left (L) or below left (BL) of the current chroma block. A most frequently used mode among the candidate chroma Intra modes can be selected as the current chroma Intra mode. In another embodiment, if none of the luma coding modes associated with the n sub-blocks of the sub-block set is the Intra angular mode, DC mode or planar mode, the derived-mode (DM) Intra prediction can be considered as unavailable to the current chroma Intra mode.

In one embodiment, the sub-block set consists of four corner sub-blocks located at a top left (TL) corner, a top right (TR) corner, a bottom left (BL) corner and bottom right (BR) corner. In another embodiment, the sub-block set consists of four middle sub-blocks located adjacent to a middle position of the corresponding luma block area, and the four middle sub-blocks consist of an upper left middle sub-block (M1), an upper right middle sub-block (M2), a lower left middle sub-block (M3) and a lower right middle sub-block (M4). In yet another embodiment, the sub-block set consists of four corner sub-blocks and four middle sub-blocks of the corresponding luma block area.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, in the reference software called JEM (joint exploration model) based on HEVC reference software (HM), a chroma CU may use DM mode (derived mode from the corresponding luma component) by copying the Intra mode of a corresponding luma CU. However, it is possible that the corresponding luma block is non-Intra coded, such as IBC mode, palette mode, Inter mode or a mode rather than DC, planar or angular mode. Therefore, this would leave the chroma Intra mode undefined. Accordingly, various methods to overcome this issue are disclosed in the present invention.

Chroma DM Mode Assignment for Corresponding Non-Intra Mode Luma Block

In the present invention, a chroma DM mode is specified when the corresponding luma block is non-Intra coded. The non-Intra mode refers to any mode other than an angular mode, DC mode or planar mode. Accordingly, the present invention is able to handle the case that chroma plane and luma plane are coded separately and have different block partitioning structures, and the corresponding luma block of the chroma block may be non-Intra coded, such as IBC mode, palette mode, PCM mode, Inter mode, etc.

According to this method, a corresponding luma block area for the chroma block will be identified first based on the top-left chroma pixel address. The meaning of the "corresponding luma block area" has been described in the background section of the present disclosure. This luma block address will be treated as the start of a luma block. When the video color format is 420, the width of this luma block is 2×width_chroma and the height of this luma CU is 2×height_chroma, where width_chroma is the width and height_chroma is the height of the current chroma. In other words, the corresponding luma block area is twice as wide and twice as high as the chroma block when the video color format is 420. When the video color format is 422, the width of this luma block is 2×width_chroma and the height of this luma block is equal to height_chroma. In other words, the corresponding luma block area is twice as wide and has the same height as the chroma block when the video color format is 422. When the video color format is 444, the width of this luma block is equal to width_chroma and the height of this luma block is equal to height_chroma. In other words, the corresponding luma block area has the same width and height as the chroma block when the video color format is 444.

Figure 11:
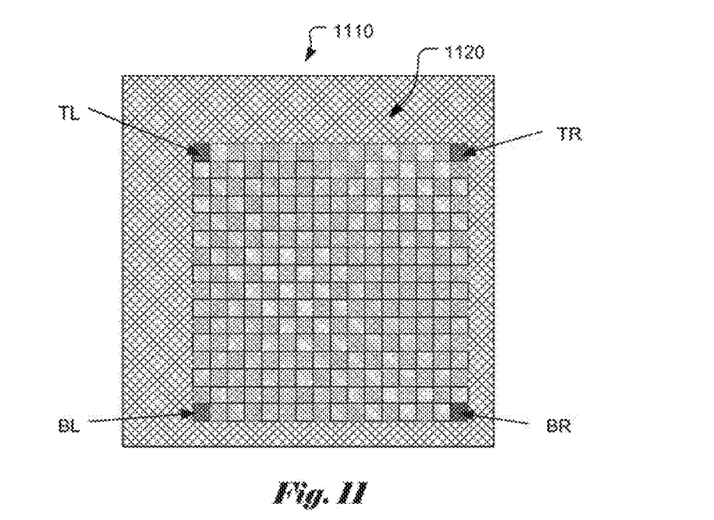
FIG. 11 illustrates an example of four luma minimum blocks (TL, TR, BL and BR) in the four corners of a corresponding luma block area.

For each corresponding luma block area (e.g. luma CU/PU/TU), there are four corner luma minimum blocks, including the top left minimum luma block (TL), top right minimum luma block (TR), bottom left minimum luma block (BL) and bottom right minimum luma block (BR). The minimum block or smallest block is also referred as a sub-block in this disclosure. FIG. 11 illustrates an example of four luma minimum blocks in the four corners, where block 1110 corresponds to a luma CTB and block 1120 corresponds to a luma CU, PU or TU area.

Figure 12:
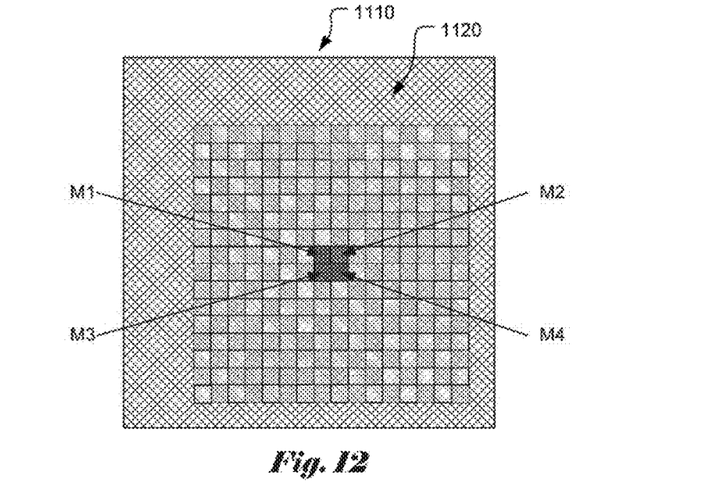
FIG. 12 illustrates an example of four middle luma minimum blocks (M1, M2, M3 and m4) in a corresponding luma block area.

There are four middle minimum blocks (i.e., sub-blocks) as indicated by M1, M2, M3 and M4 as shown in FIG. 12. The upper left middle minimum block is designated as M1, the upper right minimum block is designated as M2, the lower left minimum block is designated as M3 and the lower right minimum block is designated as M4. There are N minimum blocks for each row and K minimum blocks for each column for the corresponding luma block, where N and K are determined according to:

$N$=block width/minimum block width, and $K$=block height/minimum block height.

M1 is the minimum block that has a distance of (N/2−1) minimum blocks from the CB above boundary, and a distance of (M/2−1) minimum blocks from the CB left boundary.

M2 is the minimum block that has a distance of N/2 minimum blocks from the CB above boundary, and a distance of (M/2−1) minimum blocks from the CB left boundary.

M3 is the minimum block that has a distance of (N/2−1) minimum blocks from the CB above boundary, and a distance of M/2 minimum blocks from the CB left boundary.

M4 is the minimum block that has a distance of N/2 minimum block from the CB above boundary, and a distance of M/2 minimum block from the CB left boundary.

In one method, the encoder and decoder will check n positions among the 8 positions (i.e., TL, TR, BL, BR, M1, M2, M3, M4), where n can be 1, 2, 3, 4, 5, 6, 7, 8. After n is decided, the encoder and decoder can choose any n positions from those eight positions. For example, if n is 4, the encoder, the decoder can choose the four positions corresponding to TL, TR, BL and BR. Alternatively, the encoder and decoder can choose the four positions corresponding to M1, M2, M3 and M4. The encoder and decoder can check these n positions one by one until one of them is Intra angular mode, DC mode or planar mode coded. If none of these modes is angular mode, DC mode, or planar mode, a default Intra mode is padded for this chroma block according to an embodiment of the present invention. The default Intra mode can be specified as described in a later part of this disclosure. The order of selecting these n modes can have many variants.

In another embodiment, when the chroma Intra mode is DM mode, the encoder and decoder will check TL, TR, BL, BR, M1, M2, M3, M4 positions one by one until one of them is Intra angular mode, DC mode, or planar mode coded. The Intra mode of the corresponding luma block will be used to for the chroma block. If none of them is Intra angular mode, DC mode, or planar mode coded, a default Intra mode will be used for the chroma block. The default Intra mode will be described in a later part of this disclosure. Note that the check order of these blocks can have many variants. For example, the encoder and decoder can check TL, M1, M2, M3, M4, TR, BL and BR positions in order. In another example, the encoder and decoder can check M4, TL, TR, BL, BR, M3, M2 and M1 positions in order.

In yet another embodiment, when the chroma Intra mode is DM mode, the encoder and decoder will check TL, M2, M3, M4 positions one by one until one of them is Intra angular mode, DC mode or planar mode coded. The Intra mode of the corresponding block will be used for the chroma block. If none of them is Intra angular mode, DC mode or planar mode coded, a default Intra mode will be used for the chroma block. The default Intra mode will be described in a later part of this disclosure. Note that the check order of these blocks can have many variants. For example, the encoder and decoder can check TL, M4, M2, M3 positions in order. In another example, the encoder and decoder can check M4, TL, M3 M2 positions in order.

In yet another embodiment, when the chroma Intra mode is DM mode, the encoder and decoder will check TL, TR, BL, BR and M4 positions one by one until one of them is Intra angular mode, DC mode, or planar mode coded. The Intra mode of the corresponding block will be used for the chroma block. If none of them is Intra angular mode, DC mode, or planar mode coded, a default Intra mode will be used for the chroma block. The default Intra mode will be described in a later part of this disclosure. Note that the check order of these blocks can have many variants.

In yet another method, when the chroma Intra mode is DM mode, the encoder and decoder will check n positions among the eight positions (i.e., TL, TR, BL, BR, M1, M2, M3, M4), where n can be 1, 2, 3, 4, 5, 6, 7 or 8. After n is decided, the encoder and decoder can choose any n positions from those eight positions. For example, if n is 4, the encoder and decoder can choose the four positions corresponding to TL, TR, BL and BR. Alternatively, the encoder and decoder can choose the four positions corresponding to M1, M2, M3 and M4. The encoder and decoder can check all these n positions one by one. The encoder and decoder can choose the most frequently used luma Intra mode for the chroma block coded in DM mode. When none of these positions is Intra angular mode, DC mode, or planar mode coded, a default Intra mode is padded for this chroma block. The default Intra mode will be described in a later part of this disclosure. The order of these n modes can have many variants.

In yet another method, when the chroma Intra mode is DM mode, the encoder and decoder will check n positions among the eight positions (i.e., TL, TR, BL, BR, M1, M2, M3, M4), n can be 1, 2, 3, 4, 5, 6, 7 or 8. After n is decided, the encoder and decoder can choose any n positions from those eight positions. For example, if n is 4, the encoder and decoder can choose the four positions corresponding to TL, TR, BL and BR. Alternatively, the encoder and decoder can choose the four positions corresponding to M1, M2, M3 and M4. The encoder and decoder can choose these n modes one by one until one of them is Intra angular mode, DC mode, or planar mode coded. If none of these positions is Intra angular mode, DC mode, or planar mode coded, the DM mode is treated as unavailable for the current chroma block. The chroma Intra mode list can be shortened by 1, and the corresponding code word will be changed. The order of these n modes can have many variants.

In yet another method, when the chroma Intra mode is DM mode, the encoder and decoder will check n positions among the eight positions (i.e., TL, TR, BL, BR, M1, M2, M3, M4), n can be 1, 2, 3, 4, 5, 6, 7 or 8. After n is decided, the encoder and decoder can choose any n positions from those eight positions. For example, when n is 4, the encoder and decoder can choose the four positions corresponding to TL, TR, BL and BR. Alternatively, the encoder and decoder can choose the four positions corresponding to M1, M2, M3 and M4. The encoder and decoder can check these n positions one by one. The encoder and decoder can choose the Intra angular mode, DC mode, or planar mode that is used most frequently as the luma Intra mode for the chroma block coded in DM mode. If none of these positions is Intra angular mode, DC mode, or planar mode coded, the DM mode is treated as unavailable for the current chroma block. The chroma Intra mode list can be shortened by 1, and the corresponding code word will be changed.

Default Mode Padded for Chroma Intra DM Mode

In one method, the default mode can be a pre-defined Intra mode. This Intra mode can be hard coded for the encoder and decoder. This Intra mode can also be signaled at Sequence Parameter Set (SPS), or Picture Parameter Set (PPS), or slice header.

For example, the default mode can be planar mode, DC mode, vertical mode or horizontal mode.

Figure 13:
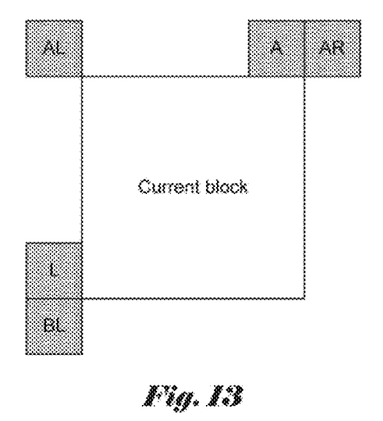
FIG. 13 illustrates an example of the neighboring blocks of the current chroma block used to derive the default Intra mode.

In another method, the default mode can be derived for each chroma block from its neighboring blocks. The chroma block can check the Intra mode of neighboring blocks located at above left (AL), above (A), above right (AR), left (L) or below left (BL) of the current block and find the most frequently used one as the Intra mode for current block. An example of the neighboring blocks of the current block is shown in FIG. 13.

In a third method, the first available Intra angular mode, DC mode or planar mode from neighboring blocks is used as the Intra mode for current block. The ordering of candidate neighboring blocks can be different; some examples are listed as follows:

1. L, A, AR, BL, AL;
2. L, A, AL, AR, BL; and
3. AL, L, A, AR, BL.

In all the above, the order of L and A can be swapped or the order of AR and BL can be swapped. In another example, the same order of neighboring locations in inter mode motion vector predictor candidate list (spatial candidates) can be used. In yet another example, the same order of neighboring locations in inter mode merge candidate list (spatial candidates) can be used.

Adaptive Motion Vector Resolution

In the $52^{nd}$ VCEG meeting, Adaptive motion vector resolution (AMVR) is disclosed in VCEG-AZ07 (Chen, et al., "*Further improvements to HMKTA-1.0*", ITU-T VCEG, document: VCEG-AZ07, 19-26 Jun. 2015, Warsaw, Poland). According to AMVR, Motion Vector Difference (MVD) between the current motion vector and a predicted motion vector of a PU can be coded with either quarter-pel resolution or integer-pel resolution. The MVD resolution is controlled at coding unit (CU) level and an integer MVD resolution flag is conditionally signaled for each CU that has at least one non-zero MVD components.

When the integer MVD resolution flag is false (i.e., indicating integer resolution not used) or not coded for a CU, the default quarter-pel MV resolution is used for all PUs belonging to the CU. Otherwise (i.e., the integer MV resolution flag being true for a CU), all PUs coded with AMVP (advanced motion vector prediction) mode belonging to the CU use integer MV resolution, while the PUs coded with merge mode still use quarter-pel MV resolution. When a PU uses integer MV resolution, the AMVP candidate list is filled with integer MV by rounding quarter-pel MVs to integer-pel MVs.

In the JEM3.0, QTBT structure is enabled so that CU is equal to PU and TU (i.e., CU=PU=TU). Also, AMVR is enabled for every CU. In this case, some of the sub-blocks may share the same MV resolution. However, these blocks have their individual flags to signal AMVR. This may introduce extra signaling overhead. In the following, various approaches to reduce the required signaling are disclosed.

Method 1: Modify the Signaling of AMVR for Binary Tree in QTBT Structure.

In order to reduce the signaling overhead, the current invention propose to signal the AMVR_signal_BT_flag at a certain BT depth (e.g. MIN_BT_DEPTH_SIGNAL_AMVR) when the binary partition is used. The sub-blocks of that binary partition share the same AMVR flag from the parent binary partition. In other words, the binary block with a depth greater than MIN_BT_DEPTH_SIGNAL_AMVR shares the AMVR flag at MIN_BT_DEPTH_SIGNAL_AMVR. The binary block with a depth smaller than MIN_BT_DEPTH_SIGNAL_AMVR signals its own AMVR flag. When the AMVR flag at the MIN_BT_DEPTH_SIGNAL_AMVR is 0, all the sub blocks use integer MV resolution. When the AMVR flag at the MIN_BT_DEPTH_SIGNAL_AMVR is 1, all the sub blocks use quarter-pel MV resolution. An example if the binary table of this AMVR_signal_BT_flag is illustrated in Table 1.

TABLE 1

| AMVR_signal_BT_flag | meaning |
| --- | --- |
| 0 | All the sub tree using integer MV resolution |
| 1 | All the sub tree using quarter-pel MV resolution |

Note that the code word can be swapped in the above Table. To code the AMVR_signal_BT_flag, N contexts can be used, where N can be 1, 2, 3, . . . , MAX_INT.

The MIN_BT_DEPTH_SIGNAL_AMVR is smaller than or equal to MaxBTSize. It can be 0, 1, 2, 3, . . . , MaxBTSize. The MIN_BT_DEPTH_SIGNAL_AMVR can be defined in the encoder and decoder macro or signaled at SPS, PPS or slice header.

In one example, MIN_BT_DEPTH_SIGNAL_AMVR corresponds to BT depth 0, which means a leaf of the QT and the sub-blocks are binary partition.

In another example, the MIN_BT_DEPTH_SIGNAL_AMVR corresponds to BT depth 1, which means the first layer of binary partition. Therefore, when the current block is quad-tree partitioned, the flag will always be signaled. It is illustrated in FIG. 14, where the AMVR flag is signaled when the BT depth is smaller than 1.

Figure 14:
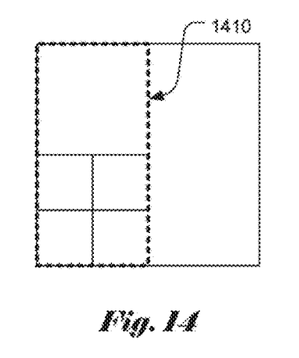
FIG. 14 illustrates an example of signaling of adaptive motion vector resolution (AMVR) for quadtree plus binary tree block partition according to an embodiment of the present invention.

In FIG. 14, the dashed-lines block 1410 is the BT with BT depth equal to 1, so that the AMVR flag will be signaled for this level. When the BT depth is smaller than 1, the MV resolution is indicated by the AMVR flag at BT depth 1. In other words, the AMVR flag is only signaled for the CU without partition.

In another embodiment, an AMVR_signal_BT_flag is signaled at a certain BT depth (e.g. MIN_BT_DEPTH_SIGNAL_AMVR) when it is binary partitioned. When the AMVR_signal_BT_flag at the MIN_BT_DEPTH_SIGNAL_AMVR is 0, all the sub-blocks use integer MV resolution. When the AMVR_signal_BT_flag at the MIN_BT_DEPTH_SIGNAL_AMVR is 1, all the sub-blocks use quarter-pel MV resolution. When the AMVR_signal_BT_flag at the MIN_BT_DEPTH_SIGNAL_AMVR is 2, all the sub-blocks will signal its own AMVR flag. The AMVR_signa_BT_flag can use fixed-length binarization, variable length binarization, Exp-Golomb-k binarization or truncated binarization. Table 2 shows an example of Exp-Golomb-k code word, where k is equal to 0.

TABLE 2

| AMVR_signal_BT_flag value | binarization | meaning |
| --- | --- | --- |
| 0 | 0 | All the sub tree using integer MV resolution |
| 1 | 10 | All the sub tree using quarter-pel MV resolution |
| 2 | 11 | All the sub tree using its own AMVR flag |

Note that the code words assignment can be changed. To code the AMVR_signal_BT_flag, N contexts can be used, where N can be 1, 2, 3, . . . , MAX_INT.

For example, MIN_BT_DEPTH_SIGNAL_AMVR can be smaller than or equal to MaxBTSize. It can be 0, 1, 2, 3, . . . , MaxBTSize. The MIN_BT_DEPTH_SIGNAL_AMVR can be defined in the encoder and decoder macro or signaled at SPS, PPS or slice header.

In one example, the MIN_BT_DEPTH_SIGNAL_AMVR corresponds to BT depth 0, which means a leaf of the QT and the sub-blocks are binary partitioned.

In another example, the MIN_BT_DEPTH_SIGNAL_AMVR corresponds to BT depth 1, which means the first layer of binary partitioned. Therefore, when the current block is quadtree partitioned, the flag will always be signaled.

In another embodiment, an AMVR_signal_BT_flag is signaled at a certain BT depth (e.g. MIN_BT_DEPTH_SIGNAL_AMVR) when it is binary partitioned. When the AMVR_signal_BT_flag at the MIN_BT_DEPTH_SIGNAL_AMVR is 0, all the sub-blocks signal its own AMVR flag. When the AMVR_signal_BT_flag at the MIN_BT_DEPTH_SIGNAL_AMVR is 1, all the sub-blocks use quarter-pel MV resolution. An example of the binary table of this AMVR_signal_BT_flag is illustrated in Table 3.

TABLE 3

| AMVR_signal_BT_flag | meaning |
| --- | --- |
| 0 | All the sub tree using its own AMVR flag |
| 1 | All the sub tree using quarter-pel MV resolution |

Note that the code word can be swapped. To code the AMVR_signal_BT_flag, N contexts can be used, where N can be 1, 2, 3, . . . , MAX_INT.

The MIN_BT_DEPTH_SIGNAL_AMVR is smaller than or equal to MaxBTSize. It can be 0, 1, 2, 3, . . . , MaxBTSize. The MIN_BT_DEPTH_SIGNAL_AMVR can be defined in the encoder and decoder macro or signaled at SPS, PPS or slice header.

In one example, the MIN_BT_DEPTH_SIGNAL_AMVR corresponds to BT depth 0, which means a leaf of the QT, and the sub-blocks are binary partitioned.

In another example, the MIN_BT_DEPTH_SIGNAL_AMVR corresponds to BT depth 1, which means the first layer of Binary partition. Therefore, when the current block is quadtree partitioned, the flag will always be signaled.

In another embodiment, an AMVR_signal_BT_flag is signaled at a certain BT depth (e.g. MIN_BT_DEPTH_SIGNAL_AMVR) when it is binary partitioned. When the AMVR_signal_BT_flag at the MIN_BT_DEPTH_SIGNAL_AMVR is 0, all the sub-blocks signal its own AMVR flag. When the AMVR_signal_BT_flag at the MIN_BT_DEPTH_SIGNAL_AMVR is 1, all the sub-blocks use integer pel MV resolution. An example of the binary table of this AMVR_signal_BT_flag is illustrated in Table 4.

TABLE 4

| AMVR_signal_BT_flag | meaning |
| --- | --- |
| 0 | All the sub tree using its own AMVR flag |
| 1 | All the sub tree using integer-pel MV resolution |

Note that the code word can be swapped. To code the AMVR_signal_BT_flag, N contexts can be used, where N can be 1, 2, 3, . . . , MAX_INT.

The MIN_BT_DEPTH_SIGNAL_AMVR is smaller than or equal to MaxBTSize. It can be 0, 1, 2, 3, . . . , MaxBTSize. The MIN_BT_DEPTH_SIGNAL_AMVR can be defined in the encoder and decoder macro or signaled at SPS, PPS or slice header.

In one example, the MIN_BT_DEPTH_SIGNAL_AMVR corresponds to BT depth 0, which means a leaf of the QT and the sub-blocks are Binary partitioned.

In another example, the MIN_BT_DEPTH_SIGNAL_AMVR corresponds to BT depth 1, which means the first layer of binary partitioned. Therefore, when the current block is quadtree partitioned, the flag will always be signaled.

Method 2: Modify the Signaling of AMVR for Quadtree in QTBT Structure

In the proposed method, an AMVR_signal_QT_flag is signalled at a certain QT depth (e.g. MIN_QT_DEPTH_SIGNAL_AMVR) when it is binary partitioned. When the AMVR_signal_QT_flag at the MIN_QT_DEPTH_SIGNAL_AMVR is 0, all the sub-blocks use integer MV resolution. When the AMVR_signal_QT_flag at the MIN_QT_DEPTH_SIGNAL_AMVR is 1, all the sub-blocks use quarter-pel MV resolution. When the AMVR_signal_QT_flag at the MIN_QT_DEPTH_SIGNAL_AMVR is 2, all the sub-blocks will signal its own AMVR flag. Table 5 illustrates an example of Exp-Golomb-k, where k is equal to 0.

TABLE 5

| AMVR_signal_QT_flag value | binarization | meaning |
| --- | --- | --- |
| 0 | 0 | All the sub tree using integer MV resolution |
| 1 | 10 | All the sub tree using quarter-pel MV resolution |
| 2 | 11 | All the sub tree using its own AMVR flag |

Note that the code words assignment can be changed. To code the AMVR_signal_QT_flag, N contexts can be used, where N can be 1, 2, 3, . . . , MAX_INT.

The MIN_QT_DEPTH_SIGNAL_AMVR is smaller than or equal to MaxQTSize. It can be 0, 1, 2, 3, . . . , MaxQTSize. The MIN_QT_DEPTH_SIGNAL_AMVR can be defined in the encoder and decoder macro or signaled at SPS, PPS or slice header.

In another embodiment, an AMVR_signal_QT_flag is signaled at a certain QT depth (e. g. MIN_QT_DEPTH_SIGNAL_AMVR) when it is binary partitioned.

When the AMVR_signal_QT_flag at the MIN_QT_DEPTH_SIGNAL_AMVR is 0, all the sub-blocks use integer MV resolution. When the AMVR_signal_QT_flag at the MIN_QT_DEPTH_SIGNAL_AMVR is 1, all the sub-blocks use quarter-pel MV resolution. Table 6 shows an example of Exp-Golomb-k, where k is equal to 0.

TABLE 6

| AMVR_signal_QT_flag value | meaning |
| --- | --- |
| 0 | All the sub tree using integer MV resolution |
| 1 | All the sub tree using quarter-pel MV resolution |

Note that the code words can be swapped. To code the AMVR_signal_QT_flag, N contexts can be used, where N can be 1, 2, 3, . . . , MAX_INT.

The MIN_QT_DEPTH_SIGNAL_AMVR is smaller than or equal to MaxQTSize. It can be 0, 1, 2, 3, . . . , MaxQTSize. The MIN_QT_DEPTH_SIGNAL_AMVR can be defined in the encoder and decoder macro or signaled at SPS, PPS or slice header.

In another embodiment, an AMVR_signal_QT_flag is signaled at a certain QT depth (e. g. MIN_QT_DEPTH_SIGNAL_AMVR) when it is binary partitioned. When the AMVR_signal_QT_flag at the MIN_QT_DEPTH_SIGNAL_AMVR is 0, all the sub-blocks signal its own AMVR flag. When the AMVR_signal_QT_flag at the MIN_QT_DEPTH_SIGNAL_AMVR is 1, all the sub-blocks use quarter-pel MV resolution. Table 7 shown an example of Exp-Golomb-k, where k is equal to 0.

TABLE 7

| AMVR_signal_QT_flag value | meaning |
| --- | --- |
| 0 | All the sub tree using its own AMVR flag |
| 1 | All the sub tree using quarter-pel MV resolution |

Note that the code words can be swapped. To code the AMVR_signal_QT_flag, N contexts can be used, where N can be 1, 2, 3, . . . , MAX_INT.

The MIN_QT_DEPTH_SIGNAL_AMVR is smaller than or equal to MaxQTSize. It can be 0, 1, 2, 3, . . . , MaxQTSize. The MIN_QT_DEPTH_SIGNAL_AMVR can be defined in the encoder and decoder macro or signaled at SPS, PPS or slice header.

In another embodiment, an AMVR_signal_QT_flag is signaled at a certain QT depth (e. g. MIN_QT_DEPTH_SIGNAL_AMVR) when it is binary partitioned. When the AMVR_signal_QT_flag at the MIN_QT_DEPTH_SIGNAL_AMVR is 0, all the sub-blocks use integer MV resolution. When the AMVR_signal_QT_flag at the MIN_QT_DEPTH_SIGNAL_AMVR is 1, all the sub-blocks signal its own AMVR flag. Table 8 illustrates an example of Exp-Golomb-k, where k is equal to 0.

TABLE 8

| AMVR_signal_QT_flag value | meaning |
| --- | --- |
| 0 | All the sub tree using integer MV resolution |
| 1 | All the sub tree using its own AMVR flag |

Note that the code words can be swapped. To code the AMVR_signal_QT_flag, N contexts can be used, where N can be 1, 2, 3, . . . , MAX_INT.

The MIN_QT_DEPTH_SIGNAL_AMVR is smaller than or equal to MaxQTSize. It can be 0, 1, 2, 3, . . . , MaxQTSize. The MIN_QT_DEPTH_SIGNAL_AMVR can be defined in the encoder and decoder macro or signaled at SPS, PPS or slice header.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 15:
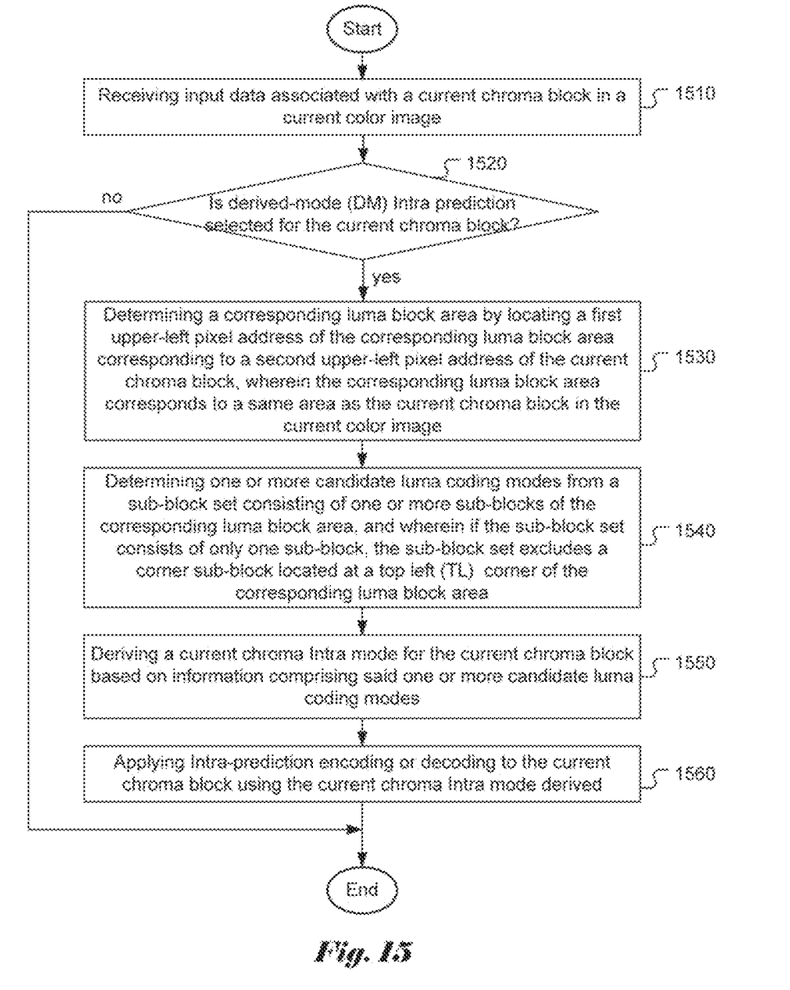
FIG. 15 illustrates a flowchart of an exemplary coding system for derived-mode Intra prediction of chroma block according to an embodiment of the present invention.

FIG. 15 illustrates a flowchart of an exemplary coding system for derived-mode Intra prediction of chroma block according to an embodiment of the present invention. According to this method, input data associated with a current chroma block in a current color image are received in step 1510. Whether the derived-mode (DM) Intra prediction is selected for the current chroma block is checked in step 1520. If the resulted is "yes" (i.e., the current chroma block being a DM-coded block), steps 1530 through 1560 are performed. Otherwise (i.e., the "no" path), steps 1530 through 1560 are skipped. In step 1530, a corresponding luma block area is determined by locating a first upper-left pixel address of the corresponding luma block area corresponding to a second upper-left pixel address of the current chroma block, wherein the corresponding luma block area corresponds to a same area as the current chroma block in the current color image. In step 1540, one or more candidate luma coding modes are determined from a sub-block set consisting of one or more sub-blocks of the corresponding luma block area, and wherein if the sub-block set consists of only one sub-block, the sub-block set excludes a corner sub-block located at a top left (TL) corner of the corresponding luma block area. In step 1550, a current chroma Intra mode is derived for the current chroma block based on information comprising said one or more candidate luma coding modes. In step 1560, Intra-prediction encoding or decoding is applied to the current chroma block using the current chroma Intra mode derived.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
   receiving input data associated with a current chroma block in a current color image;
   when and while derived-mode (DM) Intra prediction is selected for the current chroma block:
   determining a corresponding luma block area by locating a first upper-left pixel address of the corresponding luma block area corresponding to a second upper-left pixel address of the current chroma block, wherein the corresponding luma block area corresponds to a same area as the current chroma block in the current color image;
   determining one luma coding mode from one sub-block of the corresponding luma block area, wherein determining said one luma coding mode comprises determining that the luma coding mode associated with the sub-block is none of an Intra angular mode, a DC mode, or planar mode;
   designating a default Intra mode as a current chroma Intra mode for the current chroma block based on determining that the luma coding mode associated with the sub-block is none of an Intra angular mode, a DC mode, or planar mode; and
   applying Intra-prediction encoding or decoding to the current chroma block using the designated default Intra mode.

2. The method of claim 1, wherein the current chroma block corresponds to one chroma coding unit (CU) and the corresponding luma block area corresponds to one luma coding unit (CU).

3. The method of claim 1, wherein the sub-block of the corresponding luma block area corresponds to one smallest luma coding unit (CU).

4. The method of claim 1, wherein said one luma coding mode corresponds to an invalid mode under the selected DM Intra prediction, and wherein the designated default Intra mode is a valid mode under the selected DM intra prediction.

5. The method of claim 1, wherein the default Intra mode is signaled at Sequence Parameter Set (SPS), or Picture Parameter Set (PPS), or slice header.

6. The method of claim 1, wherein the default Intra mode corresponds to planar mode, DC mode, vertical mode or horizontal mode.

7. The method of claim 1, wherein the default Intra mode is derived from one or more candidate chroma Intra modes associated with one or more candidate neighboring chroma blocks of the current chroma block.

8. The method of claim 7, wherein said one or more candidate neighboring chroma blocks of the current chroma block consists of neighboring chroma blocks located at above left (AL), above (A), above right (AR), left (L) or below left (BL) of the current chroma block.

9. The method of claim 8, wherein a most frequently used mode among said one or more candidate chroma Intra modes is selected as the current chroma Intra mode.

10. An apparatus for video encoding and decoding used by a video encoding system and video decoding system respectively, the apparatus comprising one or more electronic circuits or processors arranged to:
    receive input data associated with a current chroma block in a current color image;
    when and while derived-mode (DM) Intra prediction is selected for the current chroma block:
    determine a corresponding luma block area by locating a first upper-left pixel address of the corresponding luma block area corresponding to a second upper-left pixel address of the current chroma block, wherein the corresponding luma block area corresponds to a same area as the current chroma block in the current color image;
    determine one luma coding mode from one sub-block of the corresponding luma block area, wherein determining said one luma coding mode comprises determining that the luma coding mode associated with the sub-block is none of an Intra angular mode, a DC mode, or planar mode;
    designate a default Intra mode as a current chroma Intra mode for the current chroma block based on determining that the luma coding mode associated with the sub-block is none of an Intra angular mode, a DC mode, or planar mode; and
    apply Intra-prediction encoding or decoding to the current chroma block using the designated default Intra mode.

11. The apparatus of claim 10, wherein the current chroma block corresponds to one chroma coding unit (CU) and the corresponding luma block area corresponds to one luma coding unit (CU).

12. The apparatus of claim 10, wherein the sub-block of the corresponding luma block area corresponds to one smallest luma coding unit (CU).

13. The apparatus of claim 10, wherein the default Intra mode is signaled at Sequence Parameter Set (SPS), or Picture Parameter Set (PPS), or slice header.

14. The apparatus of claim 10, wherein the default Intra mode corresponds to planar mode, DC mode, vertical mode or horizontal mode.

15. The apparatus of claim 10, wherein the default Intra mode is derived from one or more candidate chroma Intra modes associated with one or more candidate neighboring chroma blocks of the current chroma block.

16. The apparatus of claim 15, wherein said one or more candidate neighboring chroma blocks of the current chroma block consists of neighboring chroma blocks located at above left (AL), above (A), above right (AR), left (L) or below left (BL) of the current chroma block.

17. The apparatus of claim 16, wherein a most frequently used mode among said one or more candidate chroma Intra modes is selected as the current chroma Intra mode.

18. The apparatus of claim 10, wherein said one luma coding mode corresponds to an invalid mode under the selected DM Intra prediction, and wherein the designated default Intra mode is a valid mode under the selected DM intra prediction.

* * * * *